March 12, 1968  H. FELD  3,372,613
LATHE
Filed Aug. 23, 1965  2 Sheets-Sheet 1

INVENTOR: H. Feld By Richards & Geier
ATTORNEYS

United States Patent Office 3,372,613
Patented Mar. 12, 1968

3,372,613
LATHE
Heinrich Feld, Kirchen (Sieg), Germany, assignor to
H. A. Waldrich G.m.b.H., Siegen, Westphalia, Germany, a German concern
Filed Aug. 23, 1965, Ser. No. 481,586
Claims priority, application Germany, Aug. 25, 1964,
W 37,438
1 Claim. (Cl. 82—24)

ABSTRACT OF THE DISCLOSURE

A support for large lathes used for turning workpieces with large differences in diameter, wherein one or more cross slides are located between the lathe carriage and the compound slide carrying the rotary tool supporting member, the cross slide having guides upon its upper and lower surfaces which extend tangentially to the workpiece being treated.

This invention refers to a lathe and relates more particularly to a support for large lathes for turning workpieces with large differences in diameters.

The geometrical operational capacity of large lathes is always determined on the basis of the largest workpiece which can be treated thereon. Practical experience has shown that parts having maximum dimensions constitute only a small percentage of workpieces treated by such machines. Furthermore, workpieces having maximum diameters, such as turbine rotors, generator rotors and the like, are at the same time of small width.

The support for large lathes now in general use has the following construction:

A lathe carriage or an under support slides upon the guides of the lathe bed; it carries upon its upper side guides which are shifted to the extent of 90 degrees to the direction of the bed guides. A cross slide is slidably mounted upon the guides of the supporting slide and its upper surface carries the rotary part of the support which is swingable to the extent of 360 degrees. In the case of large lathes the rotary part also carries a compound support having a tool holder into which the tool is clamped.

The height of such a support construction is determined by the height of the center of the lathe. As a rule the height of the support above the upper edge of the bed amounts to 1.1 times one half of the center height. The range of movement of said cross slide upon guides shifted to the extent of 90 degrees relatively to those of the lathe bed is also approximately within the same range. The length of these guides is determined by the required path to be traversed and the length of the slide movable thereon minus the extent to which the slide can project over the ends of the guides. Thus a support of great length requires long guides for the support and, consequently, a wide bed so as to attain adequate stability in view of the substantial height of the support. This again requires a very large space for the machine and at the same time increases its weight to an extent which is greater than that required for rigid operation.

An object of the present invention is the provision of a support for large lathes which has comparatively short guides upon the carriage carried by the bed, which has a wide support member slidable on these guides and which provides a wide operational range.

Other objects of the present invention will become apparent in the course of the following specification.

In the accomplishment of the objectives of the present invention it was found desirable to provide one or several slides between the carriage carried by the bed and the slide carrying the rotary part, said intermediate slides having negative guides upon their lower surfaces and positive guides upon their upper surfaces, whereby each intermediate slide is shorter than the positive guides which carry it.

The sum of the possible movements of the individual slides corresponds at least to the required range of movement of the tool. The individual slides can be driven mechanically, namely, in such manner that they can move either individually, as well as in groups, or all together simultaneously, and that such movements can be in the same or opposite directions and with the same or different speeds.

The invention will appear more clearly from the following detailed description when taken in connection with the accompanying drawings showing by way of example, a preferred embodiment of the inventive idea.

Figure 1:
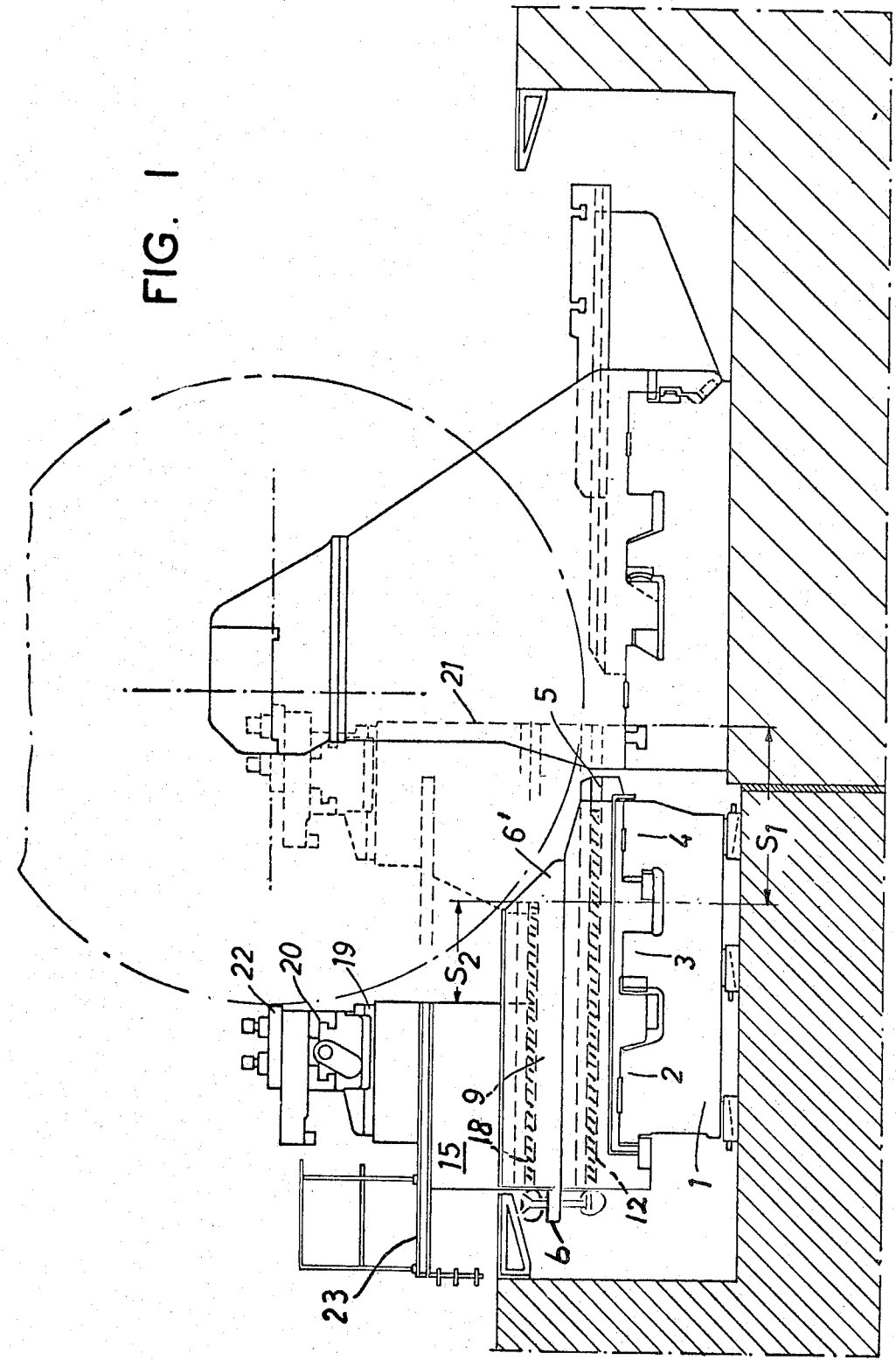
FIGURE 1 is a side view partly in section and shows a lathe support as viewed in the direction of the bed-carried guides.
Figure 2:
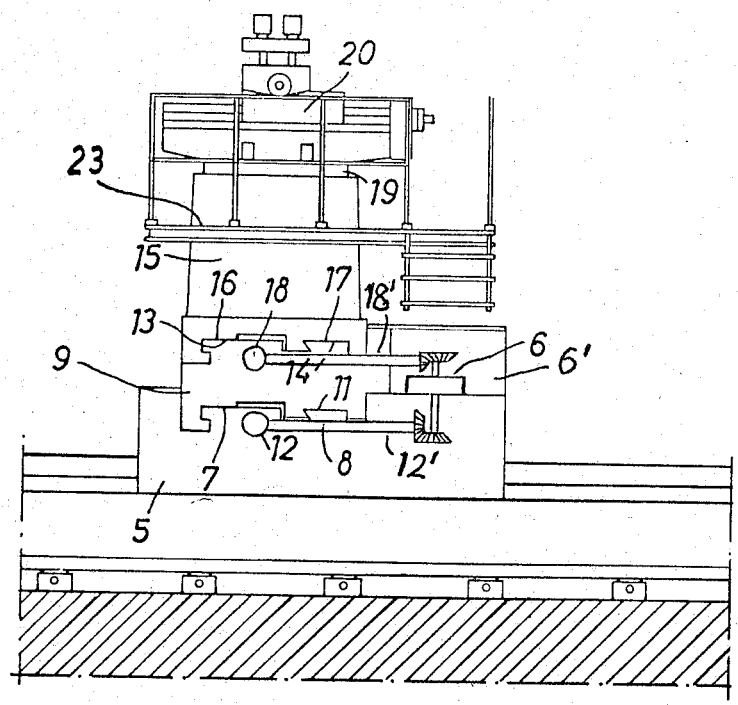
FIGURE 2 shows the same lathe support partly in section as viewed from the operational side and perpendicularly to the bed-carried guides.

The lathe shown in the drawings has a bed 1 provided with guides 2, 3 and 4. A lathe carriage 5 slides upon these guides and carries at one side a casing 6' supporting a drive 6. The carriage 5 carries positive guides 7 and 8. A cross slide 9 has negative guides 10 and 11 receiving the guides 7 and 8, so that the cross slide 9 slides upon the guides 7 and 8. The cross slide 9 is moved by a threaded spindle 12 which is actuated by the drive 6 through a suitable intermediate shaft 12' and bevel gear connections.

The upper side of the cross slide 9 is again provided with positive guides 13 and 14. A compound slide 15 has negative guides 16 and 17 receiving the guides 13 and 14, so that the compound slide 15 slides upon the positive guides 13 and 14. The compound slide 15 is driven by a threaded spindle 18 which is actuated by the drive 6 by means of a shaft 18' and bevel gear connections.

Obviously, other types of drives can be used. For example, the drive in the cross slide 9 can be an ordinary gear drive or a drive with additional reverse gears. Furthermore, an additional gear drive may be provided for selecting a speed of movement independently of the drive 6.

The compound slide 15 carries a rotary member 19 which in turn carries the compound support 20 for the tool 22.

The lathe is provided with a service platform 23.

The slides are trapezoidal in shape. The guides 13, 14 upon the upper side of the cross slide 9 may be spaced closer together than the guides 10, 11 upon the lower side.

The advantages of the described construction are particularly apparent from FIG. 1. In the example illustrated, the lathe may be used for a workpiece of, say, five meters maximum diameter and the support has been moved into a position for working upon a workpiece of such diameter. The cross slide 9 mounted upon the guides of the lathe carriage 5 is sufficiently long, while the guides of the lathe carriage 5 are comparatively short, so that adequate stability is assured. In accordance with the illustrated example the cross slide 9 can move beyond the ends of the guides 7 and 8 directed to the workpiece into the position 21 indicated by broken lines in FIG. 1, so that it moves over the path $S_1$. When the compound slide 15 carrying the rotary member 19 is moved upon the cross slide 9 to the extent of the path $S_2$, the tool 22 is moved over the total length $S_2$ plus $S_1$ until it reaches the position 21 indicated by broken lines. Thus the total range of movement of the tool 22 is $S_1+S_2$.

Consequently, the present invention has the substantial advantage of providing a pyramid-like construction of a support, wherein the torque resulting from the back pressure of the work-piece is received by the lever arm L to an extent corresponding to its increase.

It is apparent that the illustrated example is capable of various modifications within the scope of the present invention. Thus it is possible to further subdivide the entire height of the apparatus through the provision of additional slides. The lathe carriage, the cross slide and the compound slide carrying the rotary member can be so graded with respect to their height and length that in the working position for a workpiece of maximum diameter the upper edges of the slides and of the carriage which are directed toward the workpiece, can all lie upon a circle the diameter of which is somewhat greater than the maximum diameter of the workpiece.

It is also possible to make the distance between the guides 7 and 8 greater than the distance between the guides 16 and 17, so as to provide a pyramid-like structure in the direction of the feed forces as well.

Although it happens rather rarely that workpieces having a maximum diameter have to be faced from head on, it is possible to carry out this with the machine of the present invention in one operation without interruption. This is made possible in that all the slides located one above the other can carry out the feed movement simultaneously. By suitably adjusting relative movements of an upper and a lower slide in different directions and with different feed speeds, fine turning feeds can be produced which cannot be attained by normal switching possibilities of a feed drive.

All such and other variations and modifications are to be included within the scope of the present invention.

What is claimed is:

1. A support for large lathes turning workpieces with large differences in diameters, said support comprising, in combination, a bed having parallel guides, a lathe carriage slidably mounted upon the guides of said bed and having positive guides extending at right angles to the guides of said bed, at least one cross slide having upper and lower surfaces, negative guides upon said lower surface in engagement with the positive guides of said carriage, and positive guides parallel to the negative guides upon said upper surface, a drive moving the cross slide, a compound slide having negative guides in engagement with the positive guides of said cross slide, and a tool-carrying rotary support carried by said compound slide, said cross slide being shorter than the positive guides of said carriage, the guides of said cross slide extending tangentially to the workpiece being treated, and carriage and said slides having such height and length that in a working position for a workpiece of maximum diameter, the upper edges of the slides and of the carriage which are directed toward the workpiece lie upon a circle the diameter of which is greater than the maximum diameter of the workpiece.

References Cited

UNITED STATES PATENTS

| 339,197 | 4/1886 | Latham | 82—24 XR |
| 2,334,616 | 11/1943 | Prorelli | 82—24 |

FOREIGN PATENTS 1,324,817  3/1963  France.

LEONIDAS VLACHOS, *Primary Examiner.*